(12) United States Patent
De Vogel et al.

(10) Patent No.: US 10,551,090 B2
(45) Date of Patent: Feb. 4, 2020

(54) FASTENING STRUCTURE AND METHOD FOR FITTING A COUPLING PROFILE TO A PITCHED ROOF COVERED WITH SHINGLES

(71) Applicant: Esdec B.V., Deventer (NL)

(72) Inventors: Vincent De Vogel, Deventer (NL); Jeroen De Vogel, Deventer (NL)

(73) Assignee: Esdec B.V., Deventer (NL)

( * ) Notice: Subject to any disclaimer, the term of this patent is extended or adjusted under 35 U.S.C. 154(b) by 65 days.

(21) Appl. No.: 15/903,108

(22) Filed: Feb. 23, 2018

(65) Prior Publication Data

US 2018/0238590 A1  Aug. 23, 2018

(30) Foreign Application Priority Data

Feb. 23, 2017 (NL) ...................................... 2018410

(51) Int. Cl.
| | |
|---|---|
| *F24S 40/44* | (2018.01) |
| *E04D 1/34* | (2006.01) |
| *H02S 20/23* | (2014.01) |
| *F24S 25/60* | (2018.01) |
| *E04D 1/36* | (2006.01) |
| *F24S 20/67* | (2018.01) |
| *F24S 25/613* | (2018.01) |
| *F24S 20/00* | (2018.01) |

(52) U.S. Cl.
CPC ................ *F24S 40/44* (2018.05); *E04D 1/34* (2013.01); *E04D 1/365* (2013.01); *F24S 20/67* (2018.05); *F24S 25/613* (2018.05); *H02S 20/23* (2014.12); *E04D 2001/3414* (2013.01); *E04D 2001/3455* (2013.01); *E04D 2001/3473* (2013.01); *F24S 2020/13* (2018.05); *F24S 2025/6002* (2018.05)

(58) Field of Classification Search
CPC .......... F24S 40/44; F24S 20/67; F24S 25/613; F24S 25/51; F24S 2025/6005; F24S 2025/6002; F24S 2020/13; H02S 20/23; E04D 1/34; E04D 1/365; E04D 2001/3414; E04D 2001/3455; E04D 2001/3473
See application file for complete search history.

(56) References Cited

U.S. PATENT DOCUMENTS

| | | | |
|---|---|---|---|
| 7,658,356 B1 * | 2/2010 | Nehls | F24S 25/613 248/300 |
| 9,003,726 B2 | 4/2015 | Sader | |
| (Continued) | | | |

FOREIGN PATENT DOCUMENTS

| | | |
|---|---|---|
| CA | 2817611 A1 | 12/2013 |
| NL | 1028379 C2 | 8/2006 |
| WO | 2013074308 A1 | 5/2013 |

*Primary Examiner* — Anita M King
(74) *Attorney, Agent, or Firm* — The Webb Law Firm (57) ABSTRACT

The invention relates to a fastening structure for being able to fit a coupling profile, in particular for fastening solar panels, to a pitched roof covered with bituminous shingles. The invention also relates to an assembly which includes a fastening structure according to the invention. The invention further relates to a kit of components which includes a fastening structure according to the invention. The invention further relates to a method for fitting a coupling profile, in particular for fastening solar panels, to a pitched roof covered with bituminous shingles, by using a fastening structure according to the invention.

30 Claims, 5 Drawing Sheets

(56) References Cited

U.S. PATENT DOCUMENTS

| | | |
|---|---|---|
| 9,435,568 B2 | 9/2016 | Smidt et al. |
| 2016/0040431 A1 | 2/2016 | Stanley |
| 2016/0134230 A1 | 5/2016 | Meine et al. |
| 2016/0226435 A1 | 8/2016 | Almy et al. |
| 2016/0248369 A1 | 8/2016 | Almy |
| 2019/0131916 A1* | 5/2019 | Tomolillo ............... H02S 20/23 |

* cited by examiner

FASTENING STRUCTURE AND METHOD FOR FITTING A COUPLING PROFILE TO A PITCHED ROOF COVERED WITH SHINGLES

CROSS-REFERENCE TO RELATED APPLICATION

This application claims priority to Dutch Patent Application No. 2018410 filed Feb. 23, 2017, the disclosure of which is hereby incorporated in its entirety by reference.

BACKGROUND OF THE INVENTION

Field of the Invention

The invention relates to a fastening structure for being able to fit a coupling profile, in particular for fastening solar panels, to a, preferably pitched, roof covered with bituminous shingles. The invention also relates to an assembly which comprises a fastening structure according to the invention. The invention further relates to a kit of components which comprises a fastening structure according to the invention. The invention further relates to a method for fitting a coupling profile, in particular for fastening solar panels, to a pitched roof covered with bituminous shingles, by using a fastening structure according to the invention.

Description of Related Art

Bituminous shingles are regularly used as a roof covering, in which the shingles, as individual elements, are arranged in an overlapping manner on a roof. In this case, each bituminous shingle is usually formed by a coarse felt impregnated or soaked with bitumen or a fibreglass mat, as a result of which the shingles acquire watertight properties and are thus suitable for use as a roof covering. The typically rectangularly shaped bituminous shingles are usually covered with bitumen on both sides and are often provided on a top side with a protective layer made up of mineral granules. During the covering of a roof with bituminous shingles, the shingles are laid from the bottom to the top, with a row situated above being laid in a partially overlapping manner over a row of shingles situated underneath, preferably without continuous seams between the overlapping rows. Shingles are particularly suitable for use on a flat supporting substrate, such as a roof formed of a board material. If it is desired to fasten solar panels to a roof covered with bituminous shingles, conventional roof hooks, as described for example in NL1028379, are not suitable. Simply screwing the solar panels or a supporting structure supporting the solar panels to a roof is also not an option, since this will perforate the bituminous roof covering, which leads to considerable water leakage.

A first object of the invention is to provide a solution to the above-mentioned problems.

A second object of the invention is to provide a fastening structure as a substructure for a supporting structure for solar panels, which fastening structure can be arranged on a roof covered with bituminous shingles without this giving rise to water leakage.

SUMMARY OF THE INVENTION

To this end, the invention provides a fastening structure for solar panels, comprising: a fastening plate with a top side and a bottom side, and a first end side and a second end side, wherein, after fastening the fastening structure to a pitched roof, the first end side is higher than the second end side, which fastening plate is configured to be at least partially arranged between at least one bituminous shingle situated below and at least one bituminous shingle situated above, at least one passage opening which is arranged in the fastening plate and connects the bottom side and the top side of the fastening plate, wherein the passage opening is configured for passing through at least a part of a fastening element for fastening a coupling profile to the fastening structure and for fastening the fastening structure to a roof, wherein the at least one passage opening is at least partially surrounded by a peripheral wall which projects upwards with respect to a surface covered by the fastening plate, wherein at least one sunken drainage channel is arranged in the top side of the fastening plate, which drainage channel is positioned at a distance from the above-mentioned passage opening, and which drainage channel is configured to lead water moving over the top side in the direction of the second end side around the above-mentioned passage opening, and wherein a bottom side of the fastening plate is provided with at least one protruding structure, wherein at least a part of the protruding structure is positioned between the above-mentioned passage opening and the first end side of the fastening plate, and wherein the protruding structure is configured to interact with at least one bituminous shingle situated underneath in a substantially water-retaining manner. During the fastening of the fastening structure to a roof covered with bituminous shingles, the bituminous roof covering will be penetrated under the passage opening arranged in the fastening plate, as a result of which the roof covering as such is no longer watertight. However, as a result of the fact that the fastening structure is provided with no less than three water-retention features, it is possible to prevent rainwater which falls on the roof covering from seeping through the roof covering and damaging the underlying roof as such. A first water-retention feature which forms part of the fastening structure according to the invention is formed by the use of the upwardly projecting peripheral wall which, preferably substantially completely, surrounds the passage opening. A second water-retention feature which forms part of the fastening structure according to the invention is formed by the use of the at least one sunken drainage channel arranged in the top side of the fastening plate, at least a part of which is positioned between the passage opening and the first end side (top end side) of the fastening plate. A third water-retention feature which forms part of the fastening structure according to the invention is the use of the at least one protruding structure which is arranged on the bottom side of the fastening plate and/or forms part of the bottom side of the fastening plate. Said protruding structure is configured to depress (push in) the deformable bituminous shingles, as a result of which a sealing interaction (water-retaining interaction) is formed between the bituminous shingles (situated underneath) and the bottom side of the fastening plate. Usually, at least a part of the fastening structure will be arranged between one or more bituminous shingles situated underneath and one or more bituminous shingles situated above. In this case, the one or more shingles situated above usually substantially completely cover the first end side of the fastening plate, in order to be able to stop water from relatively easily being able to get under the fastening plate. In the operational state of the fastening structure according to the invention, in which the fastening structure is fastened to and (partially) between the bituminous shingles, (rain) water falling on the bituminous roof covering will substantially flow over a top side of the fastening plate in the direction of the second end side of the fastening plate. Water flowing in the direction of the passage opening will normally not reach the passage opening, since a large fraction of the flowing water ends up in the at least one drainage channel and is led around the passage opening via said at least one drainage channel. A possible fraction of the flowing water which may cross over the at least one sunken drainage channel, in the direction of the passage opening, will be blocked by the upwardly projecting peripheral wall, and will be forced to flow around the peripheral wall. As a result, it is possible to prevent water being able to flow into the passage opening via a top side of the passage opening. A possible water fraction which seeps downwards between the bottom side of the fastening plate and shingle(s) situated underneath and interacting therewith will be halted by the water-retaining interaction between the at least one protruding structure and the shingle(s) situated underneath, as a result of which this possible water fraction is also forced to move around the passage opening of the fastening plate, and thus to move around a (fastening) opening arranged in a shingle situated underneath. The above-mentioned combination of measures means that the fastening structure according to the invention can be fastened to a roof provided with a bituminous roof covering in a relatively watertight manner. Moreover, this fastening/installation of the fastening structure is relatively simple and can be achieved relatively simply and without specific expertise. The fastening structure according to the invention forms, de facto, the basis of a complete supporting structure for solar panels. One or more coupling profiles can be fastened to this base, to which coupling profiles one or more solar panels can be fastened in a secure manner, possibly directly, usually indirectly at the bottom between one or more supporting rails. In this case, the support structure therefore comprises one or more fastening structures according to the invention, one or more coupling profiles coupled to each fastening structure, and preferably one or more supporting rails for solar panels coupled to the coupling profiles. The coupling between a supporting rail and a coupling profile is preferably realised by means of a click-fit connection, as shown for example in Dutch patent NL1028379, of which at least the content relating to said click-fit connection is deemed to be incorporated in the present patent by way of reference. The fastening structure is particularly suitable for use on a roof covered with a bituminous roof covering, which is usually made up of bituminous shingles (partly) in the form of fish scales or overlapping stepwise, as has already been described above. Neither such a roof nor such a bituminous roof covering is provided with tiling battens or the like, as a result of which the conventional roof hook, as described for example in NL1028379, is not suitable for use on a roof provided with a bituminous covering, and the substantially flat fastening structure according to the invention—to be arranged between the shingles—is. Although the shingles are usually made from bitumen on account of the particularly good properties of bitumen for use as a roof covering, both a high degree of durability and reliable watertightness, it is conceivable to make shingles (slates) arranged on a roof from a material other than bitumen, such as for example from (flexible or rigid) plastic, wood, or stone. The fastening structure according to the invention is preferably arranged on a roof covered with (slightly) flexible shingles, such as bitumen or elastomeric (rubber-like) shingles. For the sake of completeness, it should be noted that the fastening structure according to the invention is particularly intended and designed for use on pitched roofs, but it is of course also conceivable for the fastening structure according to the invention to be used on a flat (non-pitched) roof.

The upwardly projecting peripheral wall preferably forms an integral part of the fastening plate. Usually, the passage opening will be arranged in the fastening plate by means of punching, with (automatically) an upwardly projecting peripheral wall being formed. In this case, the peripheral wall is formed by a part of the fastening plate. However, it is also conceivable for the upwardly projecting peripheral wall to be connected to the fastening plate as a separate component. In this case, the peripheral wall may, for example, be formed by a hollow cylinder which is arranged on the top side of the fastening plate.

The top side of the fastening plate is configured to be at least partially covered by at least one bituminous shingle situated above. Usually, said top side is only partially covered during use, wherein, in particular, the first end side is substantially covered by one or more shingles situated above, and wherein the second end side is not covered by shingles. Leaving the second end side free facilitates water drainage, which further reduces the risk of water leakage via the passage opening.

Preferably, the shape of the at least one sunken drainage channel is substantially complementary to the shape of a protruding structure provided on at least a part of the bottom side of the fastening plate. In particular, the drainage channel follows at least a part of the protruding structure, as a result of which they are oriented substantially parallel to one another. Preferably, the drainage channel is pressed into the top side of the fastening plate, which is usually made of plastic and/or corrosion-resistant metal, such as stainless steel or aluminium, wherein, during this pressing step, at least a part of the protruding structure is also (automatically) formed on the bottom side of the fastening plate.

In a preferred embodiment, the at least one drainage channel substantially completely protects the at least one passage opening from the first end side. Therefore, water which flows from the first end side in the direction of the second end side will only be able to reach the passage opening if the water passes and crosses over the drainage channel. This barrier prevents water from easily being able to flow in the direction of the passage opening, which prevents the occurrence of a water leakage. Preferably, the at least one passage opening is at least partially surrounded by the at least one drainage channel. Possibly, several drainage channels oriented substantially parallel to one another may be used in order to further increase the water barrier and therefore further reduce the chance of water leakage occurring.

The at least one drainage channel is preferably at least partially curved, and preferably at least partially circular. A curved shape is usually more advantageous than, for example, an angular shape, since the water to be drained via the drainage channel encounters less resistance when a curved channel (segment) is used. The at least one drainage channel preferably comprises at least one substantially linear channel segment, wherein a first end of the linear channel segment is preferably turned towards the first end side of the fastening plate, and wherein an (opposite) second end of the fastening plate is preferably turned towards the second end side of the fastening plate. In a particular preferred embodiment, the at least one substantially linear channel segment extends in the direction of the second end side, and wherein at least one substantially linear channel segment defines a bottom end of the drainage channel. Preferably, the at least one linear channel segment is substantially positioned between the passage opening and the second end side of the fastening plate.

The protruding structure (or protuberance) arranged or provided on the bottom side of the fastening plate is preferably provided with a substantially convex and/or tapering surface. Such a shape of the surface of the protruding structure which is turned towards bitumen shingles situated underneath usually makes it easier to push at least a part of the protruding structure into the shingles situated underneath, in order to bring about a substantially waterproofing (water-retaining) interaction. It is advantageous if the width of the protuberance is relatively limited, and is preferably between 1 and 10 millimetres, preferably between 3 and 7 millimetres. Such a limited width of the protuberance usually also benefits the effective depression of the shingles situated underneath.

The width of the drainage channel is usually related to the above-mentioned width of the protruding structure, and is preferably between 1 and 10 millimetres, preferably between 3 and 7 millimetres. Such dimensions are usually sufficient in order to adequately drain rainwater, for the purpose of preventing water leakage. The drainage channel is preferably situated at a distance from longitudinal edges of the fastening plate. Such a distal positioning of the drainage channel prevents water from easily being able to flow into the drainage channel via the longitudinal edges, which helps to limit the water load on the fastening plate.

The fastening plate usually has a substantially flat geometry, wherein the bottom side and the top side of the fastening plate are preferably oriented substantially parallel to one another. The usually substantially flat bottom side of the fastening plate is preferably configured for substantially positively locking connection to the bituminous shingles.

The invention also relates to an assembly of a fastening structure according to the invention, and at least one coupling profile, in particular for fastening solar panels, and at least one fastening element, wherein the at least one coupling profile is fastened to the fastening structure by means of the at least one fastening element. The coupling profile may, for example, be formed by an angle profile and/or U profile. The coupling profile may be provided with coupling elements for coupling a supporting rail for solar panels to the coupling profile. It is also conceivable for coupling elements to be configured for (direct) coupling to one or more solar panels. The fastening element may form an integral part of the coupling profile, but usually a separate component is used for the fastening element. In this case, it is conceivable, for example, for the fastening element to comprise a screw and/or bolt, configured for penetration of a roof. The assembly preferably also comprises a roof covered with bituminous shingles, wherein the fastening structure is fastened to the roof by means of the at least one fastening element. In this case, the fastening plate preferably rests on at least one shingle situated underneath, and wherein at least one shingle situated above substantially completely covers the first end side of the fastening plate. It is usually advantageous if the assembly comprises at least one sealing ring, which is positioned around and/or on the peripheral wall of the passage opening of the fastening plate, wherein the total height of the at least one sealing ring is greater than or equal to the height of the above-mentioned peripheral wall, and wherein the fastening element is configured to interact with at least one sealing ring. Using such a sealing ring usually benefits the water-retaining capabilities of the assembly.

The invention also relates to a kit of parts comprising at least one fastening structure according to the invention, at least one coupling profile, in particular for fastening solar panels, and at least one fastening element for fastening the fastening structure to a roof. The kit may also comprise one or more supporting rails, wherein each supporting rail is configured to interact with a coupling profile.

The invention further relates to a method for fitting a coupling profile, in particular for fastening solar panels, to a pitched roof covered with bituminous shingles, by using a fastening structure according to the invention, comprising the steps: A) arranging the fastening structure on a pitched roof covered with bituminous shingles, in such a way that the fastening plate of the fastening structure is positioned at least partially between at least one bituminous shingle situated underneath and at least one bituminous shingle situated above, wherein the first end side of the fastening plate is higher than the second end side of the fastening plate; B) passing at least a part of a fastening element through the passage opening of the fastening plate and fastening the fastening element to the roof, as a result of which the fastening structure is fastened to the roof; and C) fastening at least one coupling profile to the fastening structure. In this case, steps B) and C) can be performed simultaneously. Preferably, during the fastening of the fastening element to the roof, the coupling profile is also fastened to the fastening structure.

In a preferred embodiment, at least one coupling profile is provided with a passage opening for passing through at least a part of the fastening element. Preferably, during step B), the passage opening of the coupling profile is substantially positioned in line with the passage opening of the fastening plate, and subsequently allowing the fastening element to protrude through the passage openings which are substantially in line, as a result of which both components are secured with respect to one another. In this case, it is conceivable for step. C) to be performed subsequent to step B).

BRIEF DESCRIPTION OF THE DRAWINGS

The invention will be explained by means of non-limiting exemplary embodiments which are illustrated in the following figures, in which:

FIG. 2b shows a cross section of the fastening structure as shown in FIG. 2a;

DESCRIPTION OF THE INVENTION

Figure 1A:
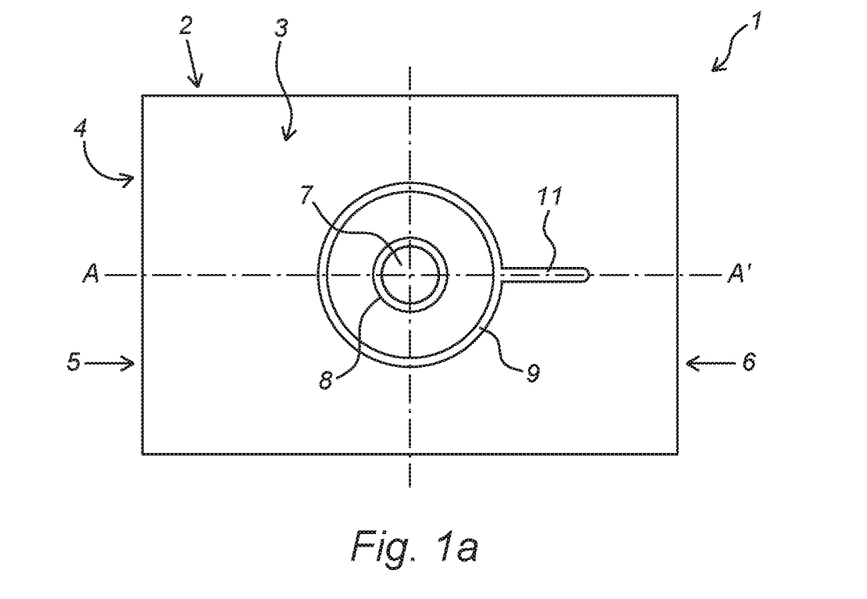
FIG. 1a diagrammatically shows a top view of a fastening structure according to the invention.

FIG. 1a diagrammatically shows a top view of a fastening structure (1) according to the invention. The fastening structure (1) comprises a fastening plate (2) with a top side (3) and a bottom side (4), and a first end side (5) and a second end side (6), and a passage opening (7) which is arranged in the fastening plate (2) and connects the bottom side (4) and the top side (3) of the fastening plate (2), wherein the passage opening (7) is completely surrounded by a peripheral wall (8) which projects upwards with respect to a surface covered by the fastening plate (2), wherein a sunken drainage channel (9) is arranged in the top side (3) of the fastening plate (2). In this case, the upwardly projecting peripheral wall (8) forms a first water-retention feature. A second water-retention feature is formed by the drainage channel (9), which is partially circular and completely surrounds the passage opening (7). In this case, the drainage channel (9) comprises a substantially linear channel segment (11) which is turned towards the second end side (6) of the fastening plate (2). The drainage channel (9) is positioned at a distance from the above-mentioned passage opening (7) and from the longitudinal edges of the fastening plate (2).

Figure 1B:
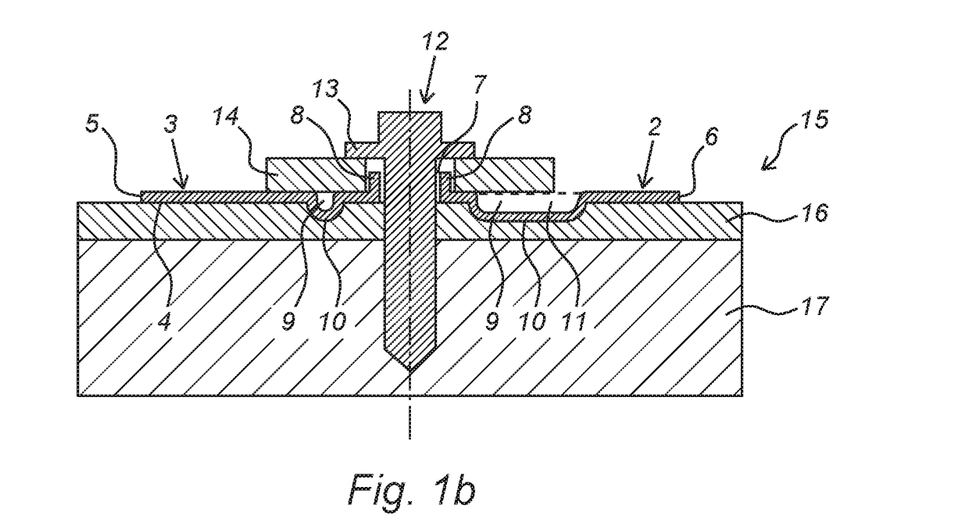
FIG. 1b shows a cross section of the fastening structure as shown in FIG. 1a in a state in which it is fastened to a roof.

FIG. 1b shows a cross section of the fastening structure (1) as shown in FIG. 1a in a state in which it is fastened to a part of a roof (15), along line A-A'. In this case, a part of a fastening element (12) has been passed through the passage opening (7) of the fastening plate (2), wherein the fastening element (12) fastens the fastening structure (1) to a part of the roof (15). The roof (15) is provided with a bituminous roof covering (16) on an underlying roof boarding (17) and the fastening element (12) penetrates both the bituminous roof covering (16) and the roof boarding (17). The fastening element (12) comprises a head provided with a radially projecting flange (13) which interacts with an additional sealing ring (14), which also engages with the fastening plate (2). In this case, the linear channel segment (11) of the drainage channel (9) extends with respect to the sealing ring (14), so that an unhindered and effective drainage of water is facilitated. The fastening plate (2) is provided with a third water-retention feature on the bottom side (4), in the form of a protruding structure (10), wherein a part of the protruding structure (10) is positioned between the passage opening (7) and the first end side (5) of the fastening plate (2) and a part of the protruding structure (10) is positioned between the passage opening (7) and the second end side (6) of the fastening plate (2). In this case, the protruding structure (10) is formed by the sunken drainage channel (9) arranged in the top side (3) of the fastening plate (2). The protruding structure (10) and the sunken drainage channel (9) are thus shaped in a complementary manner. The protruding structure (10) pushes into the bitumen roof covering (16), with there existing a dimensionally stable connection between the bottom side (4) of the fastening plate (2) and the top side of the bitumen roof covering (16). In the illustrated embodiment, the protruding structure (10) comprises a rounded shape. The linear channel segments (31a, 31b) of the drainage channel (29) are preferably shaped in such a way that, when the fastening structure (21) is fastened to a roof in combination with a sealing ring and/or coupling profile, the linear channel segments (31a, 31b) extend and/or project with respect to the sealing ring and/or the coupling profile, which makes it easier to allow the water to flow away.

Figure 2A:
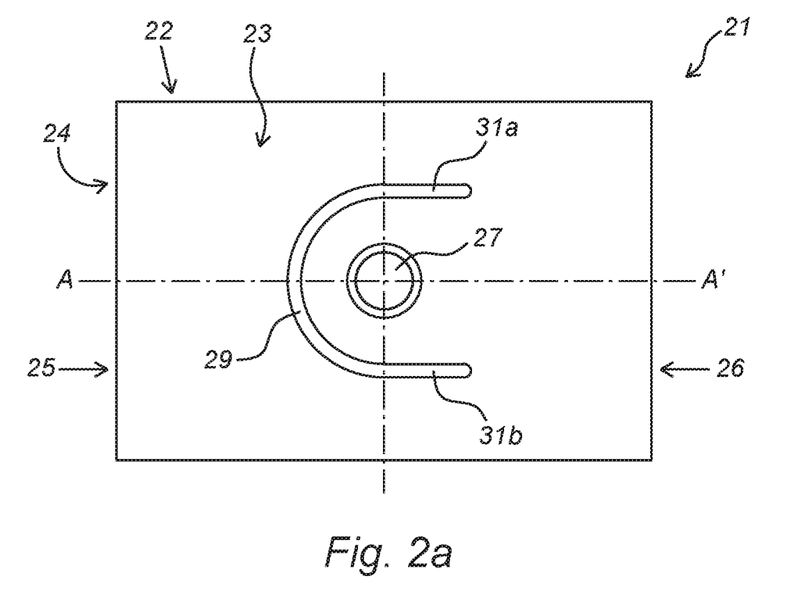
FIG. 2a diagrammatically shows a top view of a second possible embodiment of a fastening structure according to the invention.

FIG. 2a diagrammatically shows a top view of a second possible embodiment of a fastening structure (21) according to the invention. The fastening structure (21) comprises a fastening plate (22) with a top side (23) and a bottom side (24), and a first end side (25) and a second end side (26). The fastening plate (22) comprises a passage opening (27) which is partially surrounded by a sunken drainage channel (29). In this case, the drainage channel (29) is positioned at a distance from the above-mentioned passage opening (27). The drainage channel (29) also comprises two linear channel segments (31a, 31b) which are turned towards the second end side (26) of the fastening plate (22). The width of the drainage channel (29) may vary, but is usually between 1 and 10 millimetres, preferably between 3 and 7 millimetres.

Figure 2B:
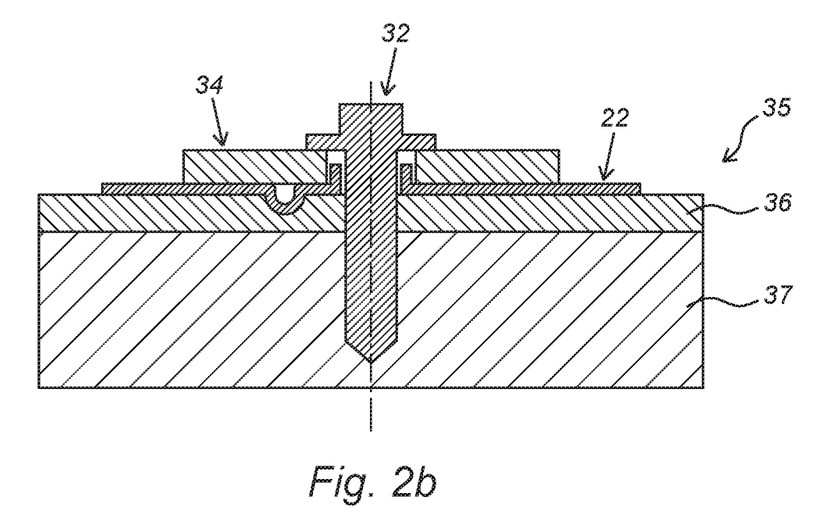

FIG. 2b shows a cross section of the fastening structure (21) as shown in FIG. 2a in a state in which it is fastened to a part of a roof (35), along line A-A'. The fastening plate (22) is connected to the bituminous roof covering (36) in a substantially dimensionally stable manner. The fastening element (32) fastens the fastening structure (21) by means of a sealing ring (34) to the roof (35), in particular to the bituminous roof covering (36) and the underlying basic structure of the roof (37).

Figure 3A:
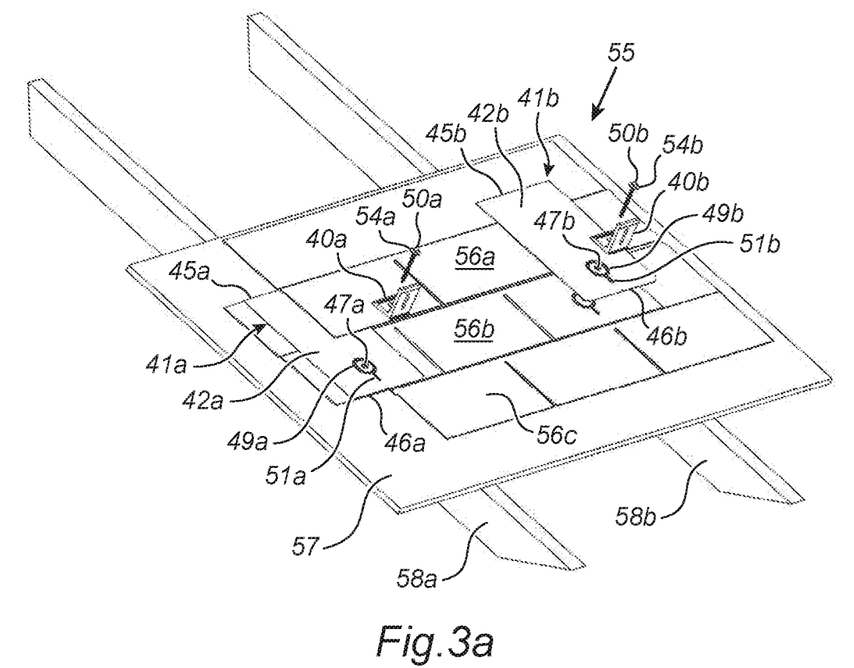
FIG. 3a shows a perspective view of two cut-away assemblies of a third possible embodiment of a fastening structure according to the invention, a coupling profile and a fastening element in combination with a roof.

FIG. 3a shows a perspective view of two cut-away assemblies of a third possible embodiment of a fastening structure (41a, 41b) according to the invention, a coupling profile (40a, 40b) for fastening solar panels and a fastening element (50a, 50b) in combination with a roof (55). The roof (55) comprises two beams (58a, 58b), which form part of a beam layer, a roof boarding (57) and a plurality of bituminous shingles (56a, 56b, 56c). In this case, the bituminous shingles (56a, 56b, 56c) are arranged on the roof (55) by being positioned in the form of fish scales. In the illustration shown, the roof (55) is only partially provided with bitumen roof covering (56a, 56b, 56c), with the bituminous shingles (56a, 56b, 56c) being configured as three-tab shingles. The fastening structures (41a, 41b) are arranged directly on a bitumen shingle (56b) situated underneath and will be covered by a bitumen shingle (56a) situated above. In this case, the first end side (45a, 45b) of each fastening plate (42a, 42b) is higher than the second end side (46a, 46b). In this case, the orientation of a fastening plate (42a, 42b) is such that the linear channel segment (51a, 51b) of the drainage channel (49a, 49b) faces the second end side (46a, 46b) of the fastening plate (42a, 42b), and thus the lowest point of the fastening plate (42a, 42b).

The positioning of an individual fastening structure (41a, 41b) is such that the passage opening (47a, 47b) of the fastening plate (42a, 42b) is substantially in line with a beam (58a, 58b) of the beam layer. The coupling profile (40a, 40b) is subsequently also positioned in line with the fastening plate (42a, 42b), in such a way that the passage opening of the coupling profile (40a, 40b) adjoins the passage opening (47a, 47b) of the fastening plate (42a, 42b). In this case, the fastening element (50a, 50b) can simultaneously fasten the fastening structure (41a, 41b) to the coupling profile (40a, 40b) and to the roof (55). In the illustrated embodiment, the fastening elements (50a, 50b) are configured as a screw (50a, 50b) and interact with a sealing ring (54a, 54b).

Figure 3B:
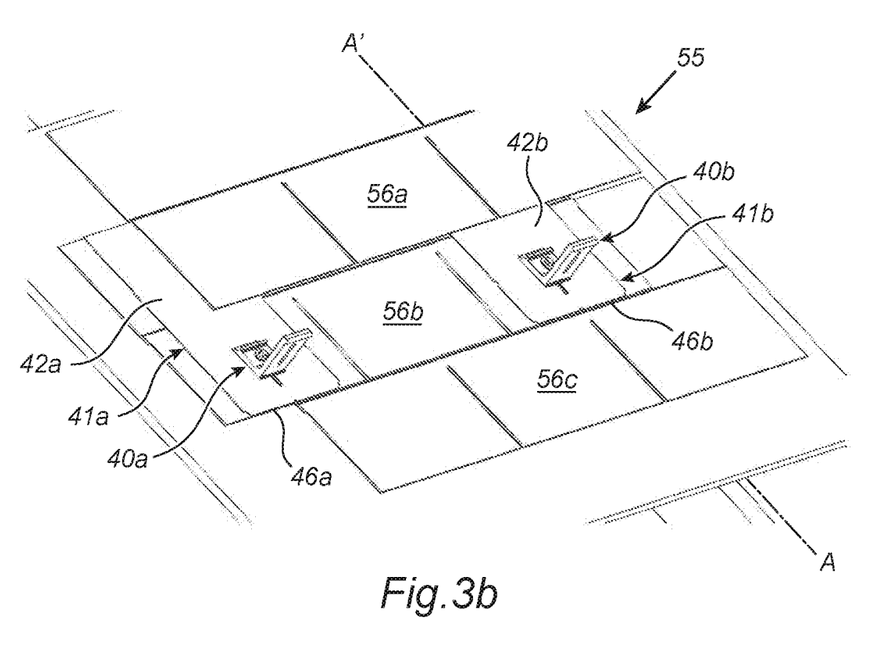
FIG. 3b shows a perspective view of the assemblies as shown in FIG. 3a in a state in which they are fastened to the roof.

FIG. 3b shows a perspective view of the assemblies as shown in FIG. 3a in a state in which they are fastened to the roof (55). In this case, the fastening structures (41a, 41b) are partially covered by the bituminous shingles (56a, 56b, 56c). In the illustrated embodiment, the bottom end side (46a, 46b) of each fastening plate (42a, 42b) adjoins the bottom end side of a tab of the bituminous shingle (46b). The circular channel segment of the drainage channel (49a, 49b) is completely covered by a coupling profile (40a, 40b) and the linear channel segment (51a, 51b) of the drainage channel (49a, 49b) extends on a bottom side of the coupling profile (40a, 40b).

Figure 3C:
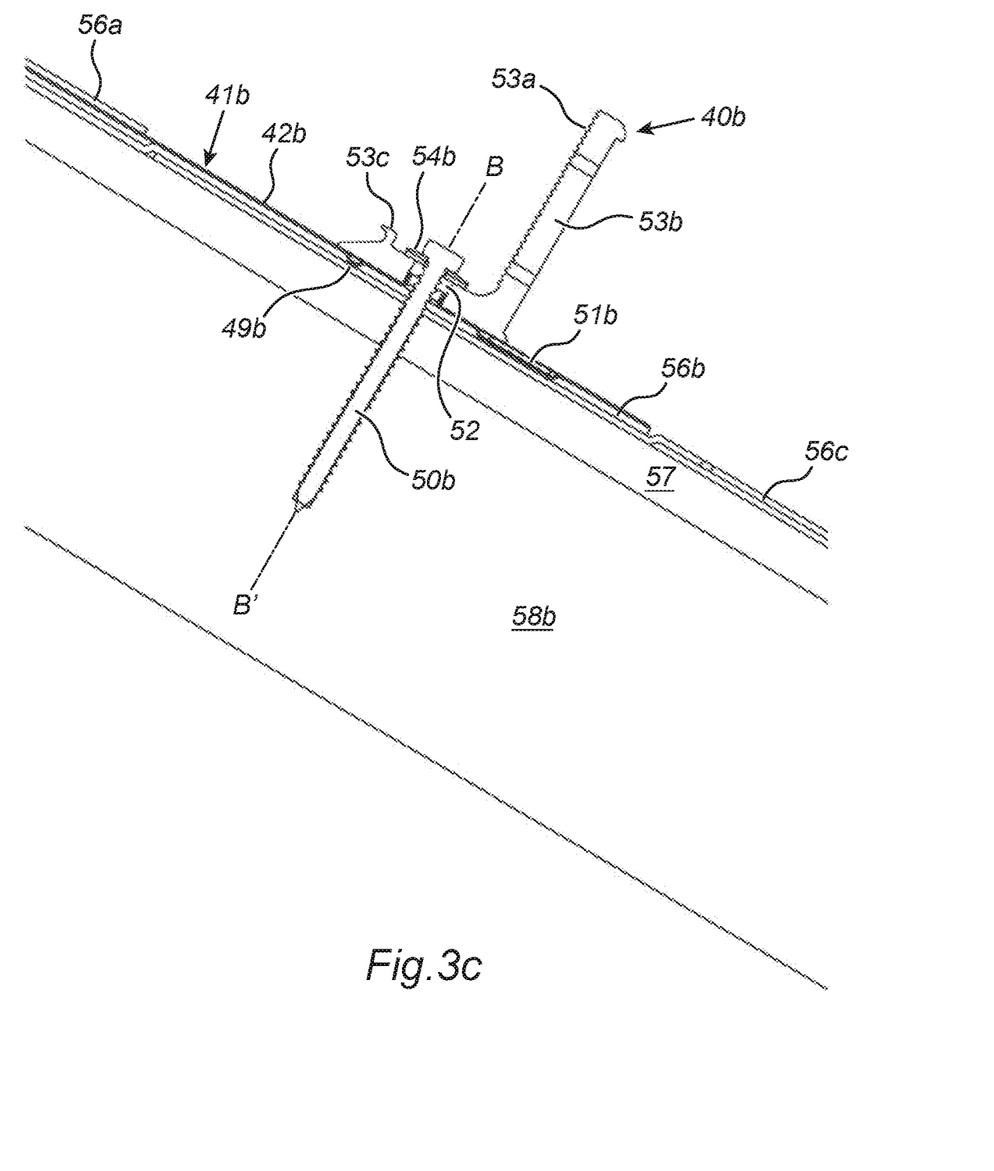
FIG. 3c shows a first cross section of an assembly shown in FIG. 3b.

FIG. 3c shows a first cross section of an assembly shown in FIG. 3b of the fastening structure (41b), the coupling profile (40*b*) and the screw (50*b*) on the roof (55), along line A-A'. In this case, the screw (50*b*) protrudes through the passage opening (52) of the coupling profile (40*b*) and the passage opening (47*b*) of the fastening plate (42*b*) and penetrates the bituminous shingles (56*b*, 56*c*), the roof boarding (57) and the beam layer (58*b*) respectively. The sealing ring (54*b*) interacts with the passage opening (52) of the coupling profile (40*b*). The coupling profile (40*b*) is also provided with a toothed structure (53*a*), a second passage opening (53*b*) and a projecting structure (53*c*). The sunken linear channel segment (51*b*) is partially protected by the coupling profile (40*b*). The circular channel segment of the drainage channel (49*b*) is situated at a distance from the longitudinal edges of the coupling profile (40*b*).

Figure 3D:
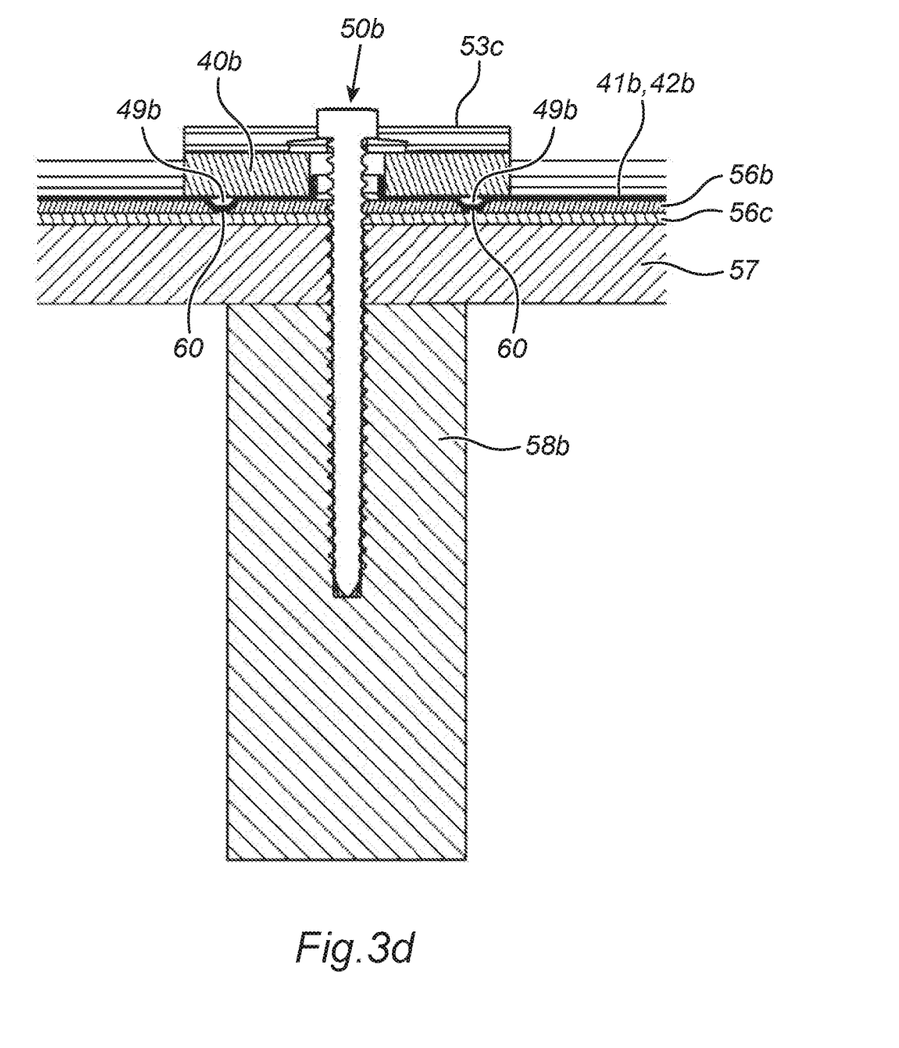
FIG. 3d shows a second cross section of an assembly shown in FIG. 3b.

FIG. 3*d* shows a second cross section of the assembly as shown in FIG. 3*c* along line B-B'. The pressing of the drainage channel (49*b*) into the bituminous shingle (56*b*) situated underneath is such that the complementary protruding structure (60) engages with a following bituminous shingle (56*c*) situated underneath.

It will be clear that the invention is not limited to the exemplary embodiments illustrated and described here, but that countless variants are possible within the framework of the attached claims which will be obvious to the person skilled in the art. In this case, it is conceivable for various inventive concepts and/or technical measures of the above-described variant embodiments to be completely or partly combined without, in this case, moving away from the inventive idea described in the attached claims.

The verb 'comprise' and its conjugations used in this patent is understood to not only mean 'comprise', but also to mean the expressions 'contain', 'substantially consist of', 'formed by', and conjugations thereof.

The invention claimed is:

1. A fastening structure for fitting a coupling profile, in particular for fastening solar panels, to a pitched roof covered with bituminous shingles, comprising:
   a fastening plate with a top side and a bottom side, and a first end side and a second end side, wherein, after fastening the fastening structure to a pitched roof, the first end side is higher than the second end side, wherein the fastening plate is configured to be at least partially arranged between at least one of the bituminous shingles situated below and at least one other of the bituminous shingles situated above,
   at least one passage opening which is arranged in the fastening plate and connects the bottom side and the top side of the fastening plate, wherein the passage opening is configured for passing through at least a part of a fastening element for fastening a coupling profile to the fastening structure and for fastening the fastening structure to the roof,
   wherein the at least one passage opening is at least partially surrounded by a peripheral wall which projects upwards with respect to a surface covered by the fastening plate,
   wherein at least one sunken drainage channel is arranged in the top side of the fastening plate, wherein the drainage channel is positioned at a distance from the passage opening, and wherein the drainage channel is configured to lead water moving over the top side in the direction of the second end side around the passage opening, and
   wherein the bottom side of the fastening plate is provided with at least one protruding structure, wherein at least a part of the protruding structure is positioned between the passage opening and the first end side of the fastening plate, and wherein the protruding structure is configured to interact with the at least one of the bituminous shingles situated below in a substantially water-retaining manner.

2. The fastening structure according to claim 1, wherein the peripheral wall forms an integral part of the fastening plate.

3. The fastening structure according to claim 1, wherein the peripheral wall is connected to the fastening plate.

4. The fastening structure according to claim 1, wherein the top side of the fastening plate is configured to be at least partially covered by the at least one other of the bituminous shingles situated above.

5. The fastening structure according to claim 1, wherein the shape of the at least one sunken drainage channel is substantially complementary to the shape of the at least one protruding structure provided on the bottom side of the fastening plate.

6. The fastening structure according to claim 5, wherein the sunken drainage channel in the top side of the fastening plate and at least a part of the protruding structure are oriented substantially parallel to one another.

7. The fastening structure according to claim 1, wherein the at least one drainage channel protects the at least one passage opening from the first end side.

8. The fastening structure according to claim 1, wherein the at least one passage opening is at least partially surrounded by the at least one drainage channel.

9. The fastening structure according to claim 1, wherein the at least one drainage channel is at least partially curved, and preferably at least partially circular.

10. The fastening structure according to claim 1, wherein the at least one drainage channel comprises at least one substantially linear channel segment.

11. The fastening structure according to claim 10, wherein the at least one substantially linear channel segment extends in the direction of the second end side, and wherein at least one substantially linear channel segment defines a bottom end of the drainage channel.

12. The fastening structure according to claim 1, wherein the protuberance is provided with a substantially convex and/or tapering surface.

13. The fastening structure according to claim 1, wherein the width of the protuberance is between 1 and 10 millimetres, preferably between 3 and 7 millimetres.

14. The fastening structure according to claim 1, wherein the width of the drainage channel is between 1 and 10 millimetres, preferably between 3 and 7 millimetres.

15. The fastening structure according to claim 1, wherein the drainage channel is situated at a distance from longitudinal edges of the fastening plate.

16. The fastening structure according to claim 1, wherein the fastening plate has a substantially flat geometry, wherein the bottom side and the top side of the fastening plate are preferably oriented substantially parallel to one another.

17. The fastening structure according to claim 1, wherein the bottom side of the fastening plate is configured for substantially positively locking connection to the bituminous shingles.

18. An assembly comprising the fastening structure and the fastening element according to claim 1, and at least one coupling profile, in particular for fastening solar panels, wherein the at least one coupling profile is fastened to the fastening structure by means of the fastening element.

19. The assembly according to claim 18, wherein the fastening element forms an integral part of the coupling profile.

20. The assembly according to claim 18, wherein the assembly also comprises a roof covered with bituminous shingles, wherein the fastening structure is fastened to the roof by means of the fastening element.

21. The assembly according to claim 20, wherein the fastening element penetrates a part of the roof.

22. The assembly according to claim 20, wherein the fastening element comprises a screw or bolt.

23. The assembly according to claim 20, wherein the fastening plate rests on at least one shingle situated underneath, and wherein at least one shingle situated above substantially completely covers the first end side of the fastening plate.

24. The assembly according to claim 20, wherein at least one sealing ring is positioned around the peripheral wall of the passage opening of the fastening plate, wherein the total height of the at least one sealing ring is greater than or equal to the height of the peripheral wall, and wherein the fastening element is configured to interact with the at least one sealing ring.

25. A kit of parts comprising at least one fastening structure according to claim 1, at least one coupling profile, in particular for fastening solar panels, and at least one fastening element for fastening the fastening structure to a roof.

26. A method for fitting the coupling profile, in particular for fastening solar panels, to a pitched roof covered with bituminous shingles, by using the fastening structure and the fastening element according to claim 1, comprising the steps:

A) arranging the fastening structure on the pitched roof covered with bituminous shingles, in such a way that the fastening plate of the fastening structure is positioned at least partially between the at least one of the bituminous shingles situated below and the at least one other of the bituminous shingles situated above, wherein the first end side of the fastening plate is higher than the second end side of the fastening plate;

B) passing at least a part of the fastening element through the passage opening of the fastening plate and fastening the fastening element to the roof, as a result of which the fastening structure is fastened to the roof; and C) fastening at least one coupling profile to the fastening structure.

27. The method according to claim 26, wherein step B) and step C) are performed simultaneously.

28. The method according to claim 27, wherein, during the fastening of the fastening element to the roof, the coupling profile is also fastened to the fastening structure.

29. The method according to claim 26, wherein at least one coupling profile is provided with a passage opening for passing through at least a part of the fastening element, wherein, during step B), the passage opening of the coupling profile is substantially positioned in line with the passage opening of the fastening plate, and subsequently allowing the fastening element to protrude through the passage openings which are substantially in line.

30. The method according to claim 26, wherein step C) is performed subsequent to step B).

* * * * *